No. 848,090. PATENTED MAR. 26, 1907.
W. G. DOTY.
COMPUTING CHEESE CUTTER.
APPLICATION FILED JAN. 22, 1906.
3 SHEETS—SHEET 3.
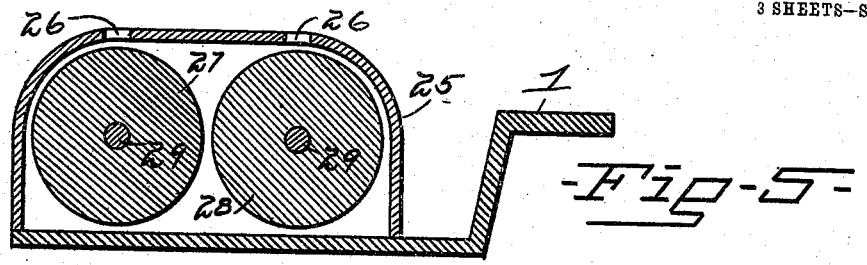

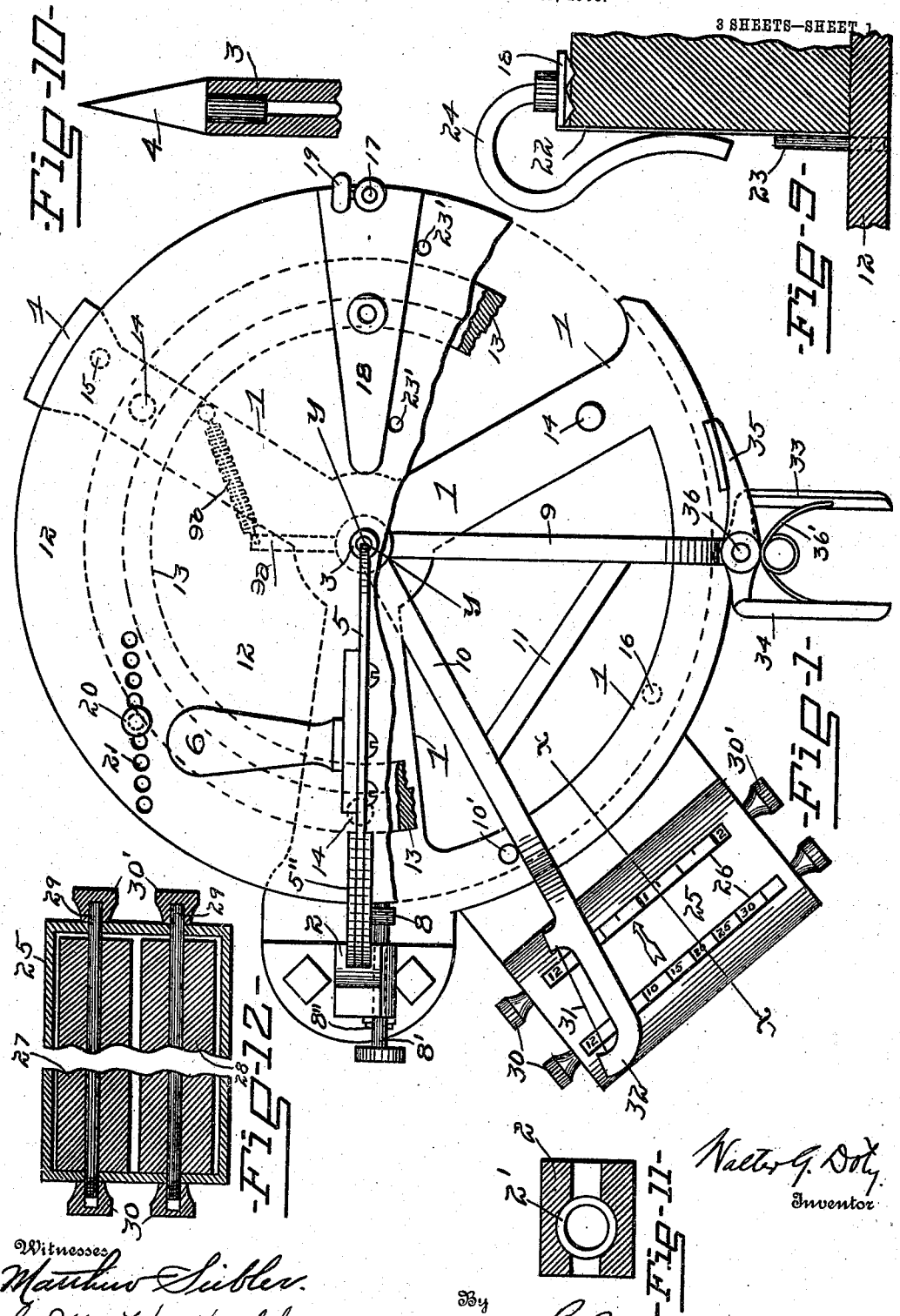

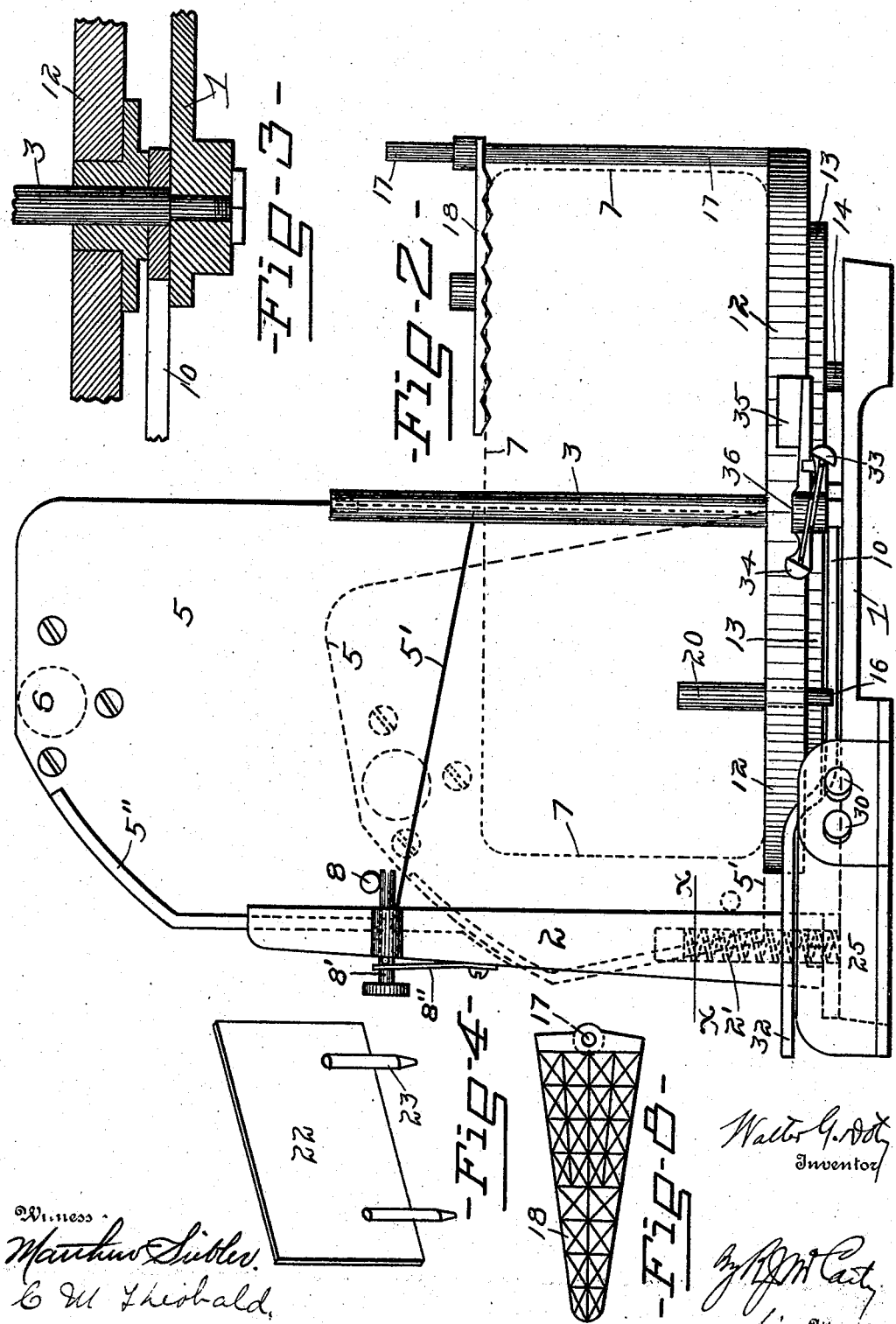

UNITED STATES PATENT OFFICE.

WALTER G. DOTY, OF DAYTON, OHIO, ASSIGNOR TO THE HEINZ MANUFACTURING COMPANY, OF DAYTON, OHIO, A CORPORATION OF OHIO.

COMPUTING CHEESE-CUTTER.

No. 848,090.　　　Specification of Letters Patent.　　　Patented March 26, 1907.

Application filed January 22, 1906. Serial No. 297,100.

*To all whom it may concern:*

Be it known that I, WALTER G. DOTY, a citizen of the United States, residing at Dayton, in the county of Montgomery and State of Ohio, have invented certain new and useful Improvements in Computing Cheese-Cutters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in computing cheese-cutters, and possesses the new and useful features hereinafter described and claimed.

The objects of the invention are several, principally among which may be briefly mentioned certain structural features appertaining to the knife or cutting blade and by which the said knife or cutting blade is prevented from adhering to the cheese after the cut is completed and as the cut of cheese is removed. To this end the knife or cutting blade is devoid of any hinge or pivotal connection, by reason of which it is given two distinct planes of movement in its cutting operations. Further means are provided for accurately computing the weight of a cheese as the same is dispensed in retail quantities and without the necessity of weighing the cheese prior to its being placed in a position upon the cheese-board.

The invention comprises further means for holding the cheese in position for cutting, such means being of a character which obviates the necessity or possibility of damaging the cheese to any extent whatever.

The invention consists of further means for computing the money value of each cut of cheese irrespective of the weight and also means for computing the weight of each cut irrespective of the money value.

These provisions are important for the reason that they enable the vending of cheese either by weight or by money value—for example, a customer may desire to purchase a quarter of a pound of cheese or any other definite amount in weight, or a customer may desire to purchase ten cents' worth or any other given amount in money irrespective of the weight. In either event the demand may be supplied accurately and without the possibility of error.

Preceding a detail description of the invention reference is made to the accompanying drawings, of which—

Figure 1 is a top plan view of my improved computing cheese-cutter, a portion of the cheese-board being broken away. Fig. 2 is a side elevation of the same. Fig. 3 is a detail sectional view on the line $y\ y$ of Fig. 1. Fig. 4 is a detached view of the shield for protecting the cut surface of the cheese from drying out. Fig. 5 is a sectional view of the housing and computing-cylinders on the line $x\ x$ of Fig. 1. Fig. 6 is a detail view of the scale removed from its cylinder, said scale being that by which the weight of each cut of cheese is computed. Fig. 7 is a similar view of the scale by which the money value of each cut of cheese is computed irrespective of the weight. Fig. 8 is a detail view of the clamping-arm which embraces the upper surface of the cheese to hold the same in position. Fig. 9 is a detail view of the clamping-arm and the shield as shown in Figs. 4 and 8. Fig. 10 is a detail view of the upper end of the guide-post. Fig. 11 is a detail of the outer guide post or standard for the knife or cutting blade on the line $x\ x$ of Fig. 2. Fig. 12 is a sectional view extending longitudinally through the computing-cylinders and their housings.

In the detail description of the invention similar reference characters indicate corresponding parts.

The foundation of the machine comprises a metallic base 1 with an upwardly-extended guide-standard 2 rising from an outer edge thereof and an upwardly-extended guide-post 3 extending from the center thereof, the upper end of this centrally-disposed guide-post being provided with a detachable needle or cone 4. The guide-standard 2 and the guide-post 3 are slotted longitudinally to receive the vertical parallel edges of the knife or cutting blade 5, which has vertical movement in said guide in cutting the cheese, the upper portion of the cutting-blade having a handle 6, by means of which the necessary movements are obtained. These movements of the cutting-blade will be more particularly described hereinafter, and for the purposes of such movements the lower or cutting edge is tapered outwardly and upwardly, as at 5', Fig. 2. Within the lower interior of the outer guide-standard 2 there is placed a suitable spring 2', which is instrumental in lifting the cutting-blade 5 to an upright position after the completion of a cut. In Fig. 2 the cutting-blade 5 is shown in its elevated position ready to descend into the cheese, the latter being shown at 7 in dotted lines, Fig. 2. The dotted position of the cutting-blade is the position it occupies after the cut is completed, and from this position the spring 2' raises the cutting-blade to an upright position. When the cutting-blade is elevated, as in Fig. 2, it may be supported in such position while the cheese is being rotated or placed in position for each successive cut by means the following devices, which are designed to engage the outer portion of the cutting-blade. These devices consist of a lug 8, which projects from one side of the blade, and a detent 8', which passes through the guide-standard 2 and engages the lower side of the lug 8. The detent 8' is normally held inwardly by means of a leaf-spring 8'', and when it is desired to lower said cutting-blade the detent 8' is drawn outwardly by means of the finger-piece on the end thereof, so as to free the lug 8.

I will now describe the triangular frame which is instrumental in rotating the cheese-board, presently to be referred to, and for indicating the computations on the value and weight scales. This frame consists of arms 9 and 10, joined centrally by a brace-bar 11 and converging at their inner ends where they loosely inclose the central guide-post 3, said guide-post forming a pivot upon which the frame oscillates in the operations of the machine. The cheese-board 12 also revolves upon this pivot or guide-post 3 above said triangular frame, and said cheese-board has upon its under side a metallic track or ring 13, which rests and moves upon a suitable number of pins 14, which project from the upper surface of the base 1. 15 designates a stop-pin projecting from said base 1 and serving to stop the cheese-board at the completion of each revolution thereof by engaging a similar stop-pin 16 on the under side of the cheese-board. Means for holding a cheese firmly upon the board without the possibility of its shifting while being operated upon consists of a post 17, which rises from the cheese-board near the edge thereof and which adjustably supports a clamping-arm 18 by means of a set-screw 19. This clamping-arm has its under face provided with suitable serrations to engage the cheese, and thus hold it firmly on the board. Coöperating with this clamping-arm is a pin 20, which fits in any one of a series of apertures 21 in the cheese-board. These apertures are arranged in a line near the edge of the cheese-board and at a suitable distance from the clamping-arm 18, and the pin 20 may be placed in any desired one of said apertures, so as to engage the sides of cakes of cheese of different diameters, and thus coöperate with the clamping-arm 18.

22 designates a shield which incloses the cut surface of the cheese after the first slice has been removed and prevents the air from drying out the subsequent cut surfaces. This shield has two pins 23, which enter apertures 23' in the cheese-board, and the said shield is firmly held against the cut surface by means of a spring or arm 24, which is secured to the clamping-arm 18 and extends over and embraces the outer side of said shield, pressing the same in contact with the cut surface, as shown in Fig. 9. The independent weight-computing scale and the money-value-computing scale, with their coöperating features, will now be described. Projecting from the outer side of the base 1 is a suitable housing 25 with two longitudinal sight-openings 26 in the upper side thereof, through which the computing-scales (shown in Figs. 6 and 7) are visible. These scales are arranged around cylinders 27 and 28 inclosed within said housing, and said cylinders are supported upon spindles 29, having bearings in said housing, and are turned to the desired positions by loosening thumb-nuts 30 and then set in their adjusted position by tightening said thumb-nuts. The other ends of the spindles 29 have rigid heads 30', which bind against the casing 25 when the thumb-nuts 30 are tightened. The scale shown in Fig. 6 indicates the weight of each slice or segment of cheese cut. The vertical column of figures to the left of this scale indicates the weight of the first slice or segment of cheese taken from the cake, the variations in this particular column being due to the different thicknesses of cakes of cheese. The graduations on this scale, aside from those in the vertical column just referred to, indicate the weight of the subsequent cuts or slices in quarters, halves, three-quarters, pounds, &c. This weight-scale is placed upon the inner cylinder 28, and the figures thereon are visible through the inner sight-openings 26.

The scale as illustrated in Fig. 7 is, as before stated, designed to indicate the money values of different cuts or slices of cheese sold in retail quantities after the first or initial cut is taken from the cake, and said scale is useful in dispensing cheese sold in cuts or slices irrespective of the weight. It will be understood that these two scales are used independently of each other and that the money-values scale is utilized where a purchaser desired to purchase five cents' worth, ten cents' worth, or any other quantity irrespective of the weight. In Fig. 7 the column of figures on the extreme left of the scale indicates the money value of the first cut of cheese, and the graduations throughout the scale indicate the money value of each succeeding cut—to wit, five cents, ten cents, fifteen cents, &c. The variations in the value of the first cut of cheese is due to the difference in the sizes of the cakes and the retail price per pound. These numerical indications, visible through the sight-openings 26, are pointed to by an indicator or pointer 31, which is secured between extended portions 32 on the arm 10 of the triangular frame hereinbefore referred to. (See Fig. 1.) This triangular frame, in addition to providing means for indicating the weights and values on the scales, also has means for engaging the periphery of the cheese-board to rotate the same the desired extent as measured by the graduations or figures on one or the other of the scales shown in Figs. 6 or 7. This means for rotating the cheese-board consists of a clamping member 35, pivoted at 36 to the outer end of the arm 9 of the triangular frame, and such clamping member 35 has an extended grip portion 34, by means of which the clamping member is made to firmly grip the cheese-board. The extension 33 on the arm 9 affords a hold for the hand in gripping the clamp-handle 34. The triangular frame, consisting of the arms or members 9 and 10, is normally held in the position shown in Fig. 1 by means of a spring 9$^b$, which is secured to the base 1 and to an extended portion 9$^a$ of said frame.

36' is a coiled expansion-spring placed between the handles 33 and 34 and serving to normally hold said handles apart. The arm 10 when drawn back to its initial position under the action of spring 9$^b$ is stopped by a lug 10', projecting from the frame.

The device is operated as follows: A cheese of any size is placed in position on the cheese-board in the following manner: The cutting-blade is entirely removed from the guides by removing the needle or cone 4 from the guide-post 3. The said needle or cone is then replaced upon the guide-post to act as an entering point in passing through the center of the cake of cheese as said cake is lowered upon the cheese-board. In such position the central guide-post 3 is passed entirely through the center of the cake of cheese, and the needle or cone is then removed from the post 3. The pin 20 is then placed in the proper aperture 21 to embrace the side or edge of the cheese. The clamp or arm 18 is then made to engage the top surface of the cheese, as in Fig. 2, and is held in such position by the thumb-screw 19. The cheese-board is then rotated to the left until stopped to bring the cheese in the proper position for the initial cut. The cutting-blade 5 is then forced downwardly through the cheese to the limit of its vertical movement. When such limit is reached, the said blade is moved forwardly in the direction of the operator to complete the cut and to free the sides of the blade from adherance to the adjacent sides of the cheese. This forward or complete movement of the cutting-blade is shown in dotted lines in Fig. 2, and in such position it will be seen that the tapered cutting edge 5' of the blade is parallel with the surface of the cheese-board and the said cutting-blade has been given two distinct movements in the cutting operation. The guide-slot in the standard 2 is of sufficient width to permit of this tilting movement being imparted to the cutting-blade. The outer vertical edge of the cutting-blade has a rib 5" on each side thereof which prevents the sides of the blade from coming in contact with the guide-standard 2 when the cutting-blade is given this final outward or tilting movement. When the knife is thus forced through in its initial incision, it is then elevated and the cheese-board is rotated, by means of the triangular frame having the grip 35, until the pointer 31 arrives in line with the arrow on the scale-housing, as shown in Fig. 1. The pointer 31 normally stands at zero through the action of the spring 9$^b$ before referred to. When the indicator 31 is moved in line with said arrow, the cheese is then in position for cutting the initial segment or slice, and the knife is then lowered to cut said initial segment, after which such segment is removed and weighed in a separate scale to ascertain the exact weight thereof. The exact weight of this segment will practically agree with some one of the indications in the scale on the left of the weight-scale. (Shown in Fig. 6.) The scale is made to indicate this weight through the sight-opening and is fixed in such position by the binding-screws 30. The weight of the initial cut having thus been ascertained, the subsequent cuts are definitely ascertained as to their weight by the graduations in alinement with said initial indications. I am now describing the operation in connection with the weight-scale, as shown in Fig. 6. The operation of the price-scale is substantially the same, with this exception that the left-hand column of figures appearing in Fig. 7 indicates the money value of the first segment of cheese taken from the cake. The said scale shows the figures in alinement with the figure indicating the money value of said initial cut, and said alined figures will indicate the money values of the subsequent cuts. It will be understood that the graduations on the value or the weight scale may be varied, if desired, to indicate ounces on the one and penny values on the other without departing from the spirit of my invention.

Having described my invention, I claim—

1. In a computing cheese-cutter, a base, cheese-supporting board rotatably mounted upon said base, a protective shield for the cut surface of the cheese, a clamping device supported upon said cheese-board and embracing the upper surface of the cheese to hold said cheese in position, and means supported on said clamping device for holding the protective shield against the cut surface of the cheese.

2. In a computing cheese-cutter, a base, a cheese-board rotatably mounted thereon, a protective shield for the cut surface of the cheese, a clamping member supported upon said cheese-board and embracing the upper surface of the cheese, means carried upon the clamping member for pressing the protective shield against the cut surface of the cheese, and a pin insertible in an aperture in the cheese-board and coöperating with said clamping member to hold the cheese in position.

3. In a computing cheese-cutter, a base, a cheese-board rotatably mounted thereon, a slidable knife supported upon guides extending from said base, the cutting edge of said knife tapering outwardly and upwardly from the inner end thereof, and said knife having vertical and lateral movement in its cutting operations.

4. In a cheese-cutter, a base, a cutting-blade having vertical and outwardly-tilting movements in its cutting operations, the outer edge of said cutting-blade having marginal ribs, inner and outer guide-standards for said blade, the outer guide-standard permitting the cutting-blade to project through it in the final or tilting movement of said blade.

5. In a cheese-cutter, a base, guide-standards projecting from said base, and a cutting-blade slidably mounted in said guide-standards, said cutting-blade having its cutting edge tapered outwardly and upwardly so that the inner end of said cutting-blade acts as a pivot for an outward-tilting movement of the cutting-blade when said blade has reached the limit of its vertical movement.

6. In a cheese-cutter, the combination with a base, a guide-standard projected from the axis of said base, and a guide-standard projected from the circumference of said base, of a cutting-blade having its cutting edge tapered outwardly and upwardly from its inner end, said cutting-blade having a two-fold movement in its cutting operation, to wit—a downward vertical movement limited by the inner end of the cutting edge, and an outward and downward movement limited by the entire length of the cutting edge of said blade.

7. In a cheese-cutter, a base, a cheese-board rotatably mounted on said base, a guide-standard projecting from the center of said base and through the center of the cheese-board, a guide-standard projecting from the circumference of said base, and a cutting-blade slidably mounted in said standards, said cutting-blade having its cutting edge tapered outwardly and upwardly, and a handle projecting from said blade by means of which a downward vertical and an outward or lateral movement is imparted to the blade in the cutting operation.

8. In a cheese-cutter, a base, a guide-standard projecting from the center of said base, said guide-standard having a detachable needle at its upper end, a guide-standard projecting from the circumference of said base, and a cutting-blade slidably mounted in said guides.

9. In a computing cheese-cutter, a base, a slidable knife supported in guide-standards rising from said base, the cutting edge of said knife tapering outwardly and upwardly from the inner end thereof, a cheese-board rotatably mounted on said base, a clamping-arm supported from said cheese-board, additional means coöperating with said clamping-arm to hold the cheese, and means for rotating said cheese-board intermittently.

10. In a computing cheese-cutter, a base, a cheese-board rotatably mounted thereon, price and weight scales to indicate the value in money and the weight of segments of cheese severed from the cake, a frame pivotally mounted below the cheese-board, means on said frame for rotating the cheese-board, and means on said frame for indicating upon the scales the desired extent of movement of the cheese-board, and means for arresting the movement of the cheese-board upon each complete rotation thereof.

11. In a computing cheese-cutter, a base, a cheese-board rotatably mounted thereon, a vertically-movable knife having its cutting edge tapered outwardly and upwardly from its innermost point of contact with the cheese, upright guides inclosing the vertical edges of said knife, scales to indicate the value in money and the weight of the segments of cheese severed from the cake, a frame pivotally mounted below the cheese-board, a gripping device carried on said frame to impart movement to the cheese-board, a pointer on said frame to indicate on one or the other scale the extent of movement to be imparted to the cheese-board for each succeeding cut of cheese, and means engaging the upper surface of the cheese to hold it in position.

12. In a computing cheese-cutter, a base, a cheese-board rotatably mounted on said base, computing-scales to indicate the values in money and the weight of the segments of cheese, a frame pivotally mounted below the cheese-board, a pointer carried on said frame, means to indicate the initial cut of the cheese, means for rotating said scales subsequently to the initial cut to adjust the same according to the weight or money value of said initial cut, and means on said frame for engaging the cheese-board to rotate the same to an extent as indicated upon the computing-scale.

13. In a computing cheese-cutter, a base, a cheese-board rotatably mounted on said base, a knife slidingly supported in guide-standards from said base, a clamping member supported on the cheese-board and engaging the top of the cheese to hold the same, a shield to inclose the cut surface of the cheese, and means extending from the clamping member and engaging said shield to hold it in contact with the cheese.

14. In a computing cheese-cutter, a base, a cheese-board rotatably mounted on said base, a knife slidingly supported in guides on said base, a clamping member engaging the upper surface of the cheese to hold the same, a removable pin on the cheese-board coöperating with said clamping member, computing-scales to indicate the values in money and the weights of the segments of cheese severed from the cake, an arbitrary indication adjacent to said scale by which the initial cut of cheese is measured, a frame pivotally mounted below the cheese-board, a scale-pointer on said frame, said pointer being movable to the indication on said scale, and also initially movable to the arbitrary indication, and means on said frame for rotating the cheese-board at the same time with the movement of the frame in indicating the scale indications.

In testimony whereof I affix my signature in presence of two witnesses.

WALTER G. DOTY.

Witnesses:
 CAROLYN M. THEOBALD,
 N. H. BROOKINS.